United States Patent
Keung et al.

(10) Patent No.: US 9,713,801 B2
(45) Date of Patent: Jul. 25, 2017

(54) SELF-HEALING MATERIAL AND PREPARATION PROCESS THEREOF

(71) Applicant: Nano and Advanced Materials Institute Limited, Hong Kong (HK)

(72) Inventors: Lok Hang Keung, Hong Kong (HK); Noel Peter Bengzon Tan, Hong Kong (HK); Wing Ho Choi, Hong Kong (HK); Wai Chak Lam, Hong Kong (HK)

(73) Assignee: Nano and Advanced Materials Institute Limited, Hong Kong (HK)

(*) Notice: Subject to any disclaimer, the term of this patent is extended or adjusted under 35 U.S.C. 154(b) by 0 days.

(21) Appl. No.: 15/414,615

(22) Filed: Jan. 24, 2017

(65) Prior Publication Data

US 2017/0128903 A1    May 11, 2017

Related U.S. Application Data

(62) Division of application No. 14/723,477, filed on May 28, 2015, now Pat. No. 9,598,313.

(60) Provisional application No. 61/997,335, filed on May 29, 2014.

(51) Int. Cl.
| | |
|---|---|
| *C08K 9/00* | (2006.01) |
| *B01J 13/14* | (2006.01) |
| *C01B 33/145* | (2006.01) |
| *C04B 14/06* | (2006.01) |
| *C04B 20/10* | (2006.01) |
| *C04B 40/06* | (2006.01) |

(52) U.S. Cl.
CPC ............. *B01J 13/14* (2013.01); *C01B 33/145* (2013.01); *C04B 14/062* (2013.01); *C04B 20/1037* (2013.01); *C04B 40/0675* (2013.01)

(58) Field of Classification Search
CPC ... C04B 14/062; C04B 20/1033; C01B 33/45; B01J 13/0008
See application file for complete search history.

*Primary Examiner* — Hannah Pak

(57) ABSTRACT

The present application provides a self-healing material which comprises silica sol as self-healing agent encapsulated by a polymeric shell. The self-healing material may be further embedded in a concrete mixture to heal micro-cracks in concrete. A method for preparing the self-healing material is also provided.

10 Claims, 8 Drawing Sheets

SELF-HEALING MATERIAL AND PREPARATION PROCESS THEREOF

CROSS-REFERENCE TO RELATED APPLICATION

This application is a divisional application of U.S. patent application Ser. No. 14/723,477 filed on May 28, 2015, which claims the benefit of U.S. Provisional Patent Application No. 61/997,335 filed on May 29, 2014, the entire content of which is hereby incorporated by reference.

FIELD OF TECHNOLOGY

The present application involves a self-healing material as well as a process for its preparation.

BACKGROUND

Concrete is a low cost and the most industrially used material. This is primarily due to its high compressive strength and durability which until now is considered to be an indispensable building material. However, due to long term influence of surrounding environment, micro-cracking and damage of the concrete material are inevitable. Micro-cracks in particular are not easily detected due to limited technologies. Therefore, it is difficult to repair such undetectable cracks. When cracks are not restored timely and effectively, it leads to macro-crack formation that triggers brittle fracture and shortens concrete life, consequently threatens structure safety as well. Moreover, inspection and maintenance are difficult and expensive wherein the labor cost goes up to 50% of the repair cost. Thus, timely repair of micro-cracks in concrete is of major concern.

One of the most common methods of addressing this problem in concrete is by use of self-healing agents in microcapsules embedded within the concrete mix. Recently, examples of self-healing of concretes using microencapsulation techniques have been reported. For example, microencapsulated sodium silicate has been used as a healing agent. However, the microencapsulated sodium silicate has low silica ($SiO_2$) content and is viscous. This results in less penetration into micro-cracks and thus inefficient healing of concrete. Other existing self-healing concretes using hollow fibers and hollow glass tubes are not feasible in commercial market. The use of concrete vibrator during construction process leads to the destruction of hollow fiber arrangement and design and the premature loss of the self-healing agent. The use of bacteria and calcium lactate inside clay particle as self-healing agent yields a very expensive aggregate (e.g. Euro 160/cubic meter) with an initial compressive strength 25% lower than normal concrete. In general, microcapsules produced to date are not cheap enough for mass production. Synthetic conditions and parameters are not environmental-friendly and are difficult to scale-up. There is also a problem of slow response between the microcapsules and the healing mechanism during micro-cracking.

There is a need to produce a self-healing material which is efficient in healing micro-cracks and suitable for mass production.

SUMMARY

In one aspect, the present application provides a self-healing material comprising a self-healing agent, and a polymeric shell encapsulating the self-healing agent, in which the self-healing agent comprises colloidal silica.

In one embodiment, the weight percentage of silicon dioxide in the colloidal silica may range from about 40% to about 50%.

In one embodiment, the polymeric shell may comprise at least one from the group consisting of polyurethane, polyurea, poly(urea-urethane), polystyrene, and urea-formaldehyde polymer.

In one embodiment, the self-healing material may comprise a microcapsule having a size of about 100 microns to about 200 microns.

In one embodiment, the polymeric shell may comprise a thickness of about 30 microns to about 50 microns.

In one embodiment, the self-healing material may comprise a plurality of microcapsules embedded in a concrete mixture. The microcapsule comprises a self-healing agent encapsulated by a polymeric shell, and the self-healing agent comprises colloidal silica.

In one embodiment, the concrete mixture may comprise cement, sand, crushed rock and water.

In one embodiment, the concrete mixture may comprise cement, sand, crushed rock, water in a weight ratio of about 1:1-3:1-3:0.2-0.8.

In still another aspect, the present application provides a process for preparing a self-healing material comprising a step of emulsifying a self-healing agent by at least two surfactants, in which the self-healing agent comprises colloidal silica, and a step of encapsulating the emulsified colloidal silica to form a plurality of self-healing microcapsules comprising a core of colloidal silica and a polymeric shell.

In one embodiment of the process, the weight percentage of silicon dioxide in the colloidal silica ranges from about 40% to about 50%.

In one embodiment of the process, the step of emulsification comprises emulsifying the colloidal silica in an organic phase may contain at least two surfactants which may have a combining Hydrophile-Lyophile Balance (HLB) of 3 to 5.

In one embodiment of the process, the surfactants may be selected from the group consisting of poly(ethylene glycol)-400 dioleate, poly(ethylene glycol)-8 dioleate, sorbitan laurate, poly(ethylene glycol)-40 sorbitan peroleate, lecithin glycol distearate, sorbitan trioleate and propylene glycol isostearate.

In one embodiment of the process, the surfactants may comprise poly(ethylene glycol)-400 dioleate and sorbitan trioleate.

In one embodiment of the process, the polymeric shell may comprise at least one selected from the group consisting of polyurethane, polyurea, poly(urea-urethane), polystyrene, and urea-formaldehyde polymer.

In one embodiment of the process, the microcapsule may comprise a size of about 100 microns to about 200 microns, and the polymeric shell may have a thickness of about 30 microns to about 50 microns.

In one embodiment of the process, the emulsifying step may comprise a stirring step at a speed of about 400-600 rpm.

In one embodiment of the process, the encapsulating step may comprise a stirring step at a speed of about 700-950 rpm.

In one embodiment of the process, the process may further comprise adding surfactants.

In one embodiment of the process, the process may further comprise embedding a plurality of the self-healing microcapsules in a concrete mixture.

BRIEF DESCRIPTION OF THE DRAWINGS

The embodiments of the present application are described with reference to the attached figures, wherein.

DETAILED DESCRIPTION

Figure 1:
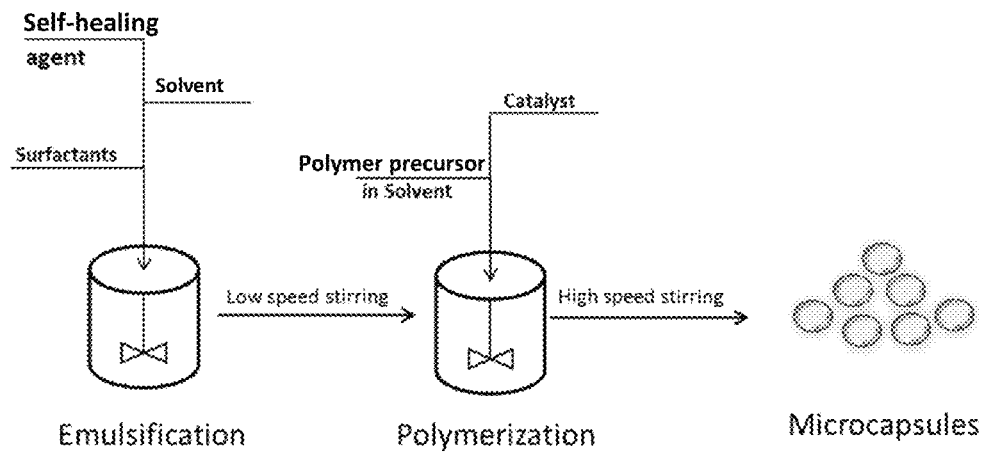
FIG. 1 shows a diagram representation of preparation of microcapsules according to some embodiments of the present application.

In the following detailed description, numerous specific details are described in order to provide a thorough understanding of the application. However the present application may be practiced without these specific details. In other instances, well known methods, procedures, components have not been described in detail so as not to obscure the present application.

Further, exemplary sizes, values and ranges may be given, but it should be understood that the present application is not limited to these specific examples.

The present application provides self-healing materials, such as in a form of self-healing microcapsule or self-healing concrete, for recovering strength during micro-cracking. Recovery of strength is gained when self-healing materials release the healing agent forming gel to fill the micro-cracks.

The present application also provides a cheaper, straight forward and industrialized process for preparing a self-healing material.

The self-healing material of the present application may employ silica sol as the healing agent encapsulated by a protective polymeric shell to form microcapsules. The microcapsules may include at least silica sol, a surfactant, and a polymeric shell. Other additives such as emulsifier, filler, adhesive and thickener may also be present in the microcapsules.

Silica sol (or colloidal silica) is a colloidal system in which solid silica particles are dispersed in a liquid solvent such as water. Silica sol may include different composition (%) of silicon dioxide. Commercially available silica sol is distributed by Sigma Aldrich with 30 wt %, 34 wt %, 40 wt %, 45 wt %, and 50 wt % silicon dioxide content suspended in water. In some embodiments of the present application, the silica sol may contain about 40-50 wt % silicon dioxide. It has been found that the percentage of silicon dioxide in the microcapsule may affect the quantity of the encapsulated material and thus the healing capability of the microcapsules. Silica sol with less than 40 wt % silicon dioxide may result in a microcapsule not having enough silicon dioxide particles. However, silicon dioxide content exceeding 50 wt % may be of excess and thus not economical for industrial production.

A common method for preparing silica sol from natural ore is through ion exchange process from liquid sodium silicate. Silica ore is mixed with an alkali solution (e.g. sodium hydroxide) and subsequently dissolved by heating and under pressure to produce liquid sodium silicate (commonly known as water glass). It then passes through an alkali solution to form silica seeds for subsequent growth into particles. This is followed by concentrating the product to 30% for commercial production.

Another method for preparing silica sol may be through hydrolysis and condensation of tetraethoxysilane (TEOS), also known as Stober method. TEOS derived from natural silicon ore undergoes some modifications and forms colloidal silica by hydrolysis with acid and subsequent condensation.

Alternatively, silica sol may be prepared from milling of fumed silica or silica gel by zirconia beads in sand mill or nanofluidizer to reduce particle size, followed by ultrasonic dispersion to form silica sol.

Silica sol may also be prepared by direct oxidation of metallurgical grade silicon (MG-silicon) without using TEOS. This may be carried out by treating MG-silicon with water in the presence of alkali catalyst producing colloidal silica with hydrogen and heat.

The shell of microcapsules of the present application may include one or more polymers. Suitable polymers for use as the shell of microcapsules may include but not limited to polyurethane, polyurea, poly(urea-urethane), polystyrene, and urea-formaldehyde polymer. Precursors of polymer used for production of the shell of microcapsules may include a diol, a polyol, a polyether polyol, a polyester polyol, a diamine, a polyamine, a diisocyanate, a monomer containing both hydroxyl and isocyanate functional groups, a monomer containing both amino and isocyanate functional groups, a monomer containing both hydroxyl and amino functional groups, styrene, divinylbenzene, urea and/or formaldehyde.

In some embodiments of the present application, the polymer of the shell of microcapsule may include polyurethane, polyurea and/or poly(urea-urethane). In some other embodiments of the present application, the polymer of microcapsule may include poly(urea-urethane).

In some embodiments, the precursors of the polymer used for production of the shell of microcapsule may include 4,4'-methylenebis(phenyl isocyanate) (MDI), toluene diisocyanate (TDI), 1,6-hexamethylene diisocyanate (HDI), isophorone diisocyanate (IPDI), 4,4'-diisocyanato dicyclohexylmethane (HMDI), poly(ethylene glycol) dioleate (POEDO), PEG-8 dioleate, sorbitan laurate, PEG-40 sorbitan peroleate, lecithin, polyoxyethylene, sorbitan trioleate, glycol distearate, propylene glycol isostearate, ethylenediamine (EDA), methylene-bis-ortho-chloroaniline (MOCA), 2,4-diamino-3,5-dimethylsuphylchlorobenzene (DDSCB), 3,5-diethyltoluenediamine, 1,6-hexane diamine (HMDA), 1,4-phenylene diamine (PDA), poly[N-(2,2-dimethoxy-1-hydroxy)] polyamines, mono-and di-[N-(2,2-dimethoxy)-1-hydroxy)] urea, mono-, di-, tri-, and/or tetra-[N-(2,2-dimethoxy)-1-hydroxy)] melamine, di-[N-(2,2-dimethoxy)-1-hydroxy)] benzoguanidine, poly[N-(2-hydroxyacetaldehyde)] polyamines, mono-and di-[N-(2-hydroxyacetaldehyde)] urea, mono-, di-, tri-, and/or tetra-[N-(2-hydroxyacetaldehyde)] melamine, poly[N-(2-hydroxyacetic acid)] polyamines, mono-and di-[N-(2-hydroxyacetic acid)] urea, mono-, di-, tri-, and/or tetra-[N-(2-hydroxyacetic acid)] melamine, di-[N-(2-hydroxyacetic acid)] benzoguanidine, poly[N-(ethane-1,2-diol)] polyamines, mono-and di-[N-(ethane-1,2-diol)] urea, mono-, di-, tri-, and/or tetra-[N-(ethane-1,2-diol)] melamine and/or di-[N-(ethane-1,2-diol)] benzoguanidine.

In some embodiments, the precursors of the polymer used for production of microcapsule may include 4,4'-methylen-ebis(phenyl isocyanate) (MDI), poly(ethylene glycol) dioleate (POEDO), sorbitan trioleate, poly[N-(ethane-1,2-diol)] polyamines, mono-and di-[N-(ethane-1,2-diol)] urea, mono-, di-, tri-, and/or tetra-[N-(ethane-1,2-diol)] melamine and/or di-[N-(ethane-1,2-diol)] benzoguanidine.

The microcapsules of the present application may be prepared by any common microencapsulation methods. Generally, microencapsulation methods may be divided into chemical methods and physical/mechanical methods. Chemical methods may include different polymerization techniques such as suspension polymerization, emulsion polymerization, dispersion and interfacial polymerization. Physical/mechanical methods may include suspension crosslinking, solvent evaporation/extraction, coacervation/phase separation, spray drying, fluidized bed coating, melt solidification, precipitation, co-extrusion, layer-by-layer deposition, supercritical fluid expansion and spinning disk. In some embodiments of the present application, the microcapsules may be prepared by interfacial polymerization.

According to some embodiments of the present application, the microcapsules may be prepared in a one-pot-two-step synthesis as shown in FIG. 1. The self-healing agent, silica sol, may be emulsified in the presence of surfactants and solvent under low speed of stirring. After certain time of stirring, the mixture may be charged with a polymer precursor and catalyst under high speed of stirring for catalytic in-situ interfacial polymerization. The resulting products may be uniform spherical microcapsules with a core-shell structure, with silica sol as the core and polymeric shell.

Suitable catalyst for catalytic polymerization of the microcapsule may include bismuth carboxylates, zinc carboxylates, alkyl tin carboxylates, oxides and mercaptides oxides. In some more embodiments, the catalyst may be dibutyltin dilaurate (DBTDL) or dibutyltin dioctanoate.

Suitable solvent may include toluene, n-propyl propionate, methyl n-propyl ketone, isobutyl isobutyrate, isobutyl alcohol, isobutyl acetate and alipathic hydrocarbons.

Suitable surfactant for emulsification may include a diol, a polyol, a polyether polyol, a polyester polyol, a diamine, and/or a polyamine. In some embodiments, the surfactant may include poly(ethylene glycol) dioleate (POEDO), PEG-8 dioleate, sorbitan laurate, PEG-40 sorbitan peroleate, lecithin, polyoxyethylene, sorbitan trioleate, glycol distearate, and/or propylene glycol isostearate. In some more embodiments, the surfactant may include poly(ethylene glycol) dioleate (POEDO) and/or sorbitan trioleate.

According to some embodiments of the present application, the surfactants may be used to emulsify silica sol and serve as precursors of the polymer used for production of microcapsules. In some embodiments, the surfactant for emulsification of silica sol may be a mixture of surfactants. In some particular embodiments, the surfactant for emulsification of silica sol may include a mixture of surfactants, each carrying functionality different from the other. In some embodiments, the surfactant may include a polyester polyol and a polyamine.

Selection and amounts of surfactants used in the emulsification of silica sol may be based on Hydrophile-Lyophile Balance (HLB) values of the surfactants. HLB value of a surfactant relates to its solubility. Low HLB value means oil-soluble while high HLB tends to be water-soluble. Stability of the emulsion of silica sol can be determined from the appearance of the emulsion and by observing phase separation by bare eyes and optical microscopy. It has been found that a mixture of surfactant having a (HLB) value ranging from about 3-5 may give excellent emulsion stability. In some embodiments, the HLB value of the mixture of surfactants may be about 5.

Different weight ratios of surfactants may be used to come up with different ranges in HLB values. The HLB value of a mixture of surfactants can be calculated using the following equation:

$$HLB = \frac{(\text{wt. ratio of } S1)(HLB \text{ of pure } S1) + (\text{wt. ratio of } S2)(HLB \text{ of pure } S2)}{100}$$

wherein S1 and S2 represent a first surfactant and a second surfactant respectively.

One of the parameters for preparing microcapsules is its size or diameter. In the application of microcapsules in concrete, its diameter may affect its mechanical strength. Too small microcapsules are hard to break while too big microcapsules are easy to break. Thus, getting the right microcapsule size may be of significance to its application in a self-healing concrete. At an optimum size, self-healing microcapsules are hard enough not to be broken easily by its surrounding environment, yet easy enough to rupture when micro-cracking occurs. A size range of about 100-200 microns may be used in this application. Three parameters were investigated to optimize the silica-based self-healing microcapsules for applications in concrete, which are the stirring speed during emulsification (emulsification speed), the stirring speed during polymerization (polymerization speed), and the monomer ratio.

It has been found that at higher emulsification speed (e.g. about 1,000-12,000 rpm), silica sols may be in very fine white droplets and the emulsion later separates into phases. This may be due to the increased shear stress that silica sol droplets undergo during emulsification. Thus, the emulsion system is not stable and precipitation occurs. However, at lower emulsification speed (e.g. about 50-500 rpm), optical images of the emulsion may show dispersed silica sol droplets. This proves that lower emulsification speed may result in more stable and dispersed silica sol droplets. In some embodiments of this application, the emulsification speed may be in the range of about 400-600 rpm. In some embodiments, the emulsification speed may be about 500 rpm.

The effect of the polymerization speed on the size of microcapsules was also studied. Increasing polymerization speed may decrease the average size of microcapsules. In some embodiments of the present application, a microcapsule particle size of about 820 microns may be obtained at around 300 rpm while the size reduces abruptly when the polymerization speed was increased to 500 rpm. In some embodiments, a gradual decrease of size of microcapsules from about 230 to about 94 microns may be observed when the polymerization speed increased from about 500 rpm up to about 1,000 rpm. The microcapsule size of about 100-200 micron may be attainable at about 700-950 rpm. In some embodiments, the polymerization speed may be about 900 rpm. This also suggests that polymerization speed controls the equilibrium between shear forces and interfacial tension of the silica sol droplets and the local velocity gradient the droplets experience. This means that at low polymerization speed, interfacial tension is higher than shear force and thus produces larger microcapsules. However, large microcapsules are broken into smaller ones when strong shear forces are higher under high polymerization speed.

In the polymerization process, aside from the effect of the polymerization speed on the microcapsule size, its effects on smoothness of the shell layer or coating size were also investigated.

In some embodiments of this application, when polymerization speed was increased from about 300 to 1,100 rpm, microcapsule evolved from a very porous surface to a smooth surface. Big pores were observed at about 300 rpm and reduced to smaller pores when speed was increased to about 500 rpm. When speed was reached to about 700 rpm, particles may gradually become smoother up to a speed of about 1,100 rpm. This observation is attributed to the fact that higher stirring speed reduces the conglomeration of poly(urea-urethane) shell formation or the polymer deposition on the droplet surface.

Results revealed that polymerization speed has a high influence on the structure of microcapsules and that it can be controlled. It is ideal that microcapsules produced do not possess pores to prevent leaking of the core material, silica sol. In this regard, the polymerization speed may be in the range of about 700-1,100 rpm. Another reason for this phenomenon is due to the ability of the microcapsules to form longer chains of polymeric shell coating by means of reaction between the polymer precursor (e.g. MDI) and the surfactant.

At constant emulsification and polymerization conditions, the amount of polymer precursor added during shell formation was also investigated. A high core/shell ratio means a high amount of core material may be present in the microcapsule with a thin shell layer.

In some embodiments of this application, results showed that the core/shell ratio decreases as the amount of polymer precursor increases. This means that the increasing addition of polymer precursor results to a thicker shell layer. Yields of microcapsules produced were also compared vis-a-vis its core/shell ratios. There was an increase in yield with an increase in polymer precursor used. From some embodiments, about 10-20 wt %., and in particular, about 15 wt. %, of polymer precursor may give the highest yield value with a minimum core/shell ratio. This means that at this condition, shell is at thickest possible. On the other hand, encapsulation efficiency has no significant change on all polymer precursor conditions.

Figure 2:
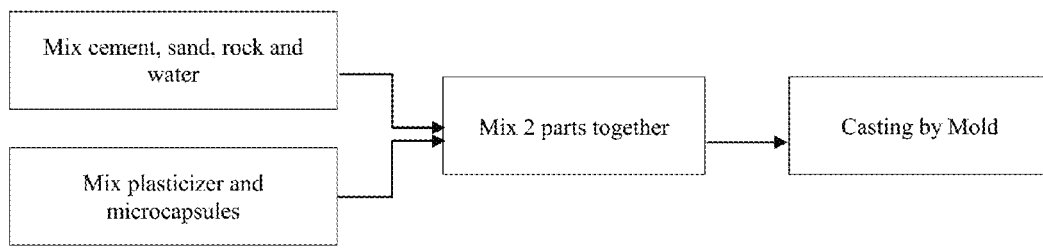
FIG. 2 is a general procedure of preparing a self-healing concrete.

The self-healing concrete of the present application may be prepared by thoroughly mixing concrete components (e.g. cement, sand, rock and water) and healing agent components (e.g. plasticizer and microcapsules) in a cement mixer. General procedure of preparing the self-healing concrete is illustrated in FIG. 2.

In some embodiments of this application, the concrete component may comprise cement, sand, crushed rock and water in a weight ratio of 1:1-3:1-3:0.2-0.8. The exemplary weight ratio of the concrete components in an embodiment is listed in Table 1.

TABLE 1

Component ratio (w/w) for preparing the concrete components.

| Cement | Sand | Rock | Water |
|---|---|---|---|
| 1 | 1.5 | 2 | 0.35 |

In some embodiments of this application, the healing agent components may comprise plasticizers and microcapsules in a volume ratio of 0.5:1. The plasticizer may be present in the amount of about 1.5% wt. of the total weight of the self-healing concrete. The microcapsule may be present in the amount of about 5% of the total volume of the self-healing concrete.

Suitable plasticizer may include all commercially available plasticizers and superplasticizers. Examples of plasticizers include SP8 (also known as MasterGlemium SKY 8588 or Glenium SP8S). Other suitable plasticizers that can be applied for concrete are sulfonated melamine-formaldehyde condensates, sulfonated naphthalene-formaldehyde condensates, modified lignosulfonates and polycarboxylate derivatives. SP8 is a superplasticizer for concrete that gives exceptionally high water reduction and significantly reduces slump loss. The unique composition of SP8 may stabilize the cement particles and disperse effectively. This may result to a flowable concrete and homogenous concrete.

Surfactants may be added in any suitable amount during preparation of the self-healing concrete. Suitable surfactants include all commercially available surfactants for preparation of concrete mixture. Examples of surfactants for concrete mixture include chitosan polyethyleneimine, polyethylene glycol bis (2-aminoethyl), poly(diallylammonium chloride), poly(acrylamide/2-methacyloxyehtytrimethylammonium bromide), poly(1-lysine hydrobromide), poly(N-vinylpyrrolidone), poly(vinylamine) hydrochloride, poly(2-vinylpridine), poly(2-vinylpyridine N-oxide), poly(N-vinylpyrrolidone/2-dimethylaminoethyl methacrylate), poly(-aminostyrene), poly(aniline), and poly(N-methylvinylamine), poly(allylamine hydrochloride).

Hereinafter the present application will be further illustrated by the following non-limitative examples.

EXAMPLE 1

For preparation of microcapsules in a 100 mL beaker, 30 mL of aqueous colloidal silica was emulsified in an organic phase containing toluene (64 mL) and 5 wt. % of binary mixture of POEDO and Span®85 (sorbitane trioleate) at stirring speed of 500 rpm. After 10 minutes of emulsification, polymerization was carried out by addition of a solution containing a fix amount of monomer (15 wt. % of MDI) in toluene and two drops of catalyst, DBTL, at 63° C. for 160 minutes at stirring speed of 900 rpm to form polymeric crosslinked shell, encapsulating the silica core material. The microcapsules produced were further washed twice with toluene to remove the remaining MDI. The reagents used in emulsification and polymerization are summarized in tables 2 and 3.

TABLE 2

Reagents used in emulsification of silica sol.
1. Emulsification

| | | |
|---|---|---|
| Reagents | Poly(ethylene glycol) 400 dioleate (POEDO) | 2.95 g |
| | Span ®85 (sorbitane trioleate) | 3.05 g |
| | Toluene | 64 mL |
| | Silica sol (50% w/w) | 30 mL |
| Parameters | Stirring Speed | 500 rpm |
| | Time | 10 min. |
| | Temperature | r.t. |

TABLE 3

Reagents used in polymerization of silica sol.
2. Polymerization

| | | |
|---|---|---|
| Reagents | 4,4'-Methylenebis (phenyl isocyanate) (MDI) (15% wt.) | 3.2 g |
| | Toluene | 10 mL |
| | Dibutyltin dilaurate (DBTL) | 2 drops |
| Parameters | Stirring Speed | 900 rpm |
| | Time | 160 min. |
| | Temperature | 63° C. |

To investigate the morphologies and properties of the microcapsules, characterization of the microcapsules was performed through SEM, FTIR, optical microscopy and nanoindentation analyses.

Figure 3A:
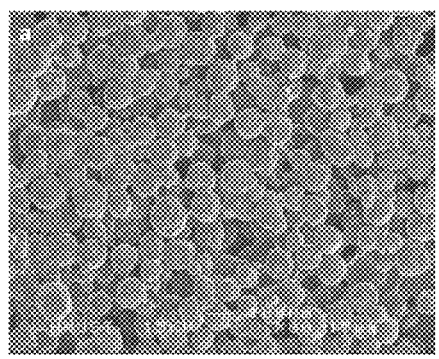
FIGS. 3(a) and 3(b) are SEM images of microcapsules from example 1 containing self-healing agent in fresh (undiluted) and diluted forms respectively.
Figure 3B:
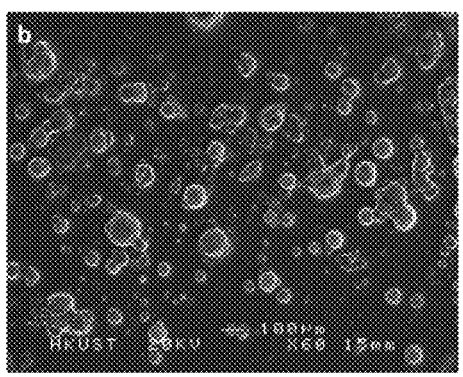
Figure 3C:
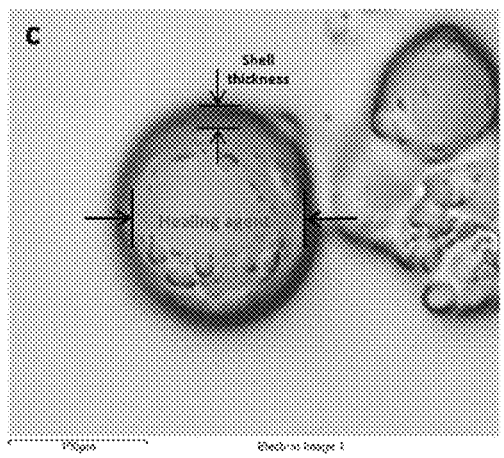
FIG. 3(c) is a SEM image of a single microcapsule from example 1 emphasizing its core and shell thickness.
Figure 3D:
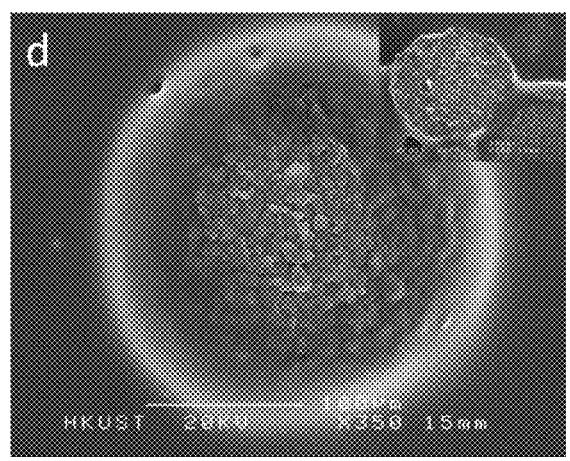
FIG. 3(d) is a SEM image showing the silica particles inside the microcapsule from example 1. The inset shows a cross-sectional view of the microcapsule.

Scanning Electron Microscope (SEM) samples were examined in JEOL-JSM 6390 and 6300 models of Field Emission Scanning Electron microscope at an accelerating voltage of 15-20 kV. Samples were spread onto a copper substrate followed by air drying. A thin layer of gold film was sputtered on the dried sample under vacuum. FIGS. 3(a) and 3(b) are the SEM images of the self-healing microcapsules in fresh (undiluted) and diluted forms respectively. From the images, fresh microcapsules are in uniform size (average size of 87 μm) and spherical shape, and highly monodispersed. A single microcapsule is displayed in FIG. 3(c) to emphasize the components of the microcapsules. Here, the core and shell are evident based on the color contrast. A further examination was performed in a single microcapsule (FIG. 3(d)) wherein it shows the silica particles inside the microcapsule. An inset SEM image shows the cross-sectional view of the microcapsule exposing the silica core content with the shell layer enveloping the core material.

Figure 4A:
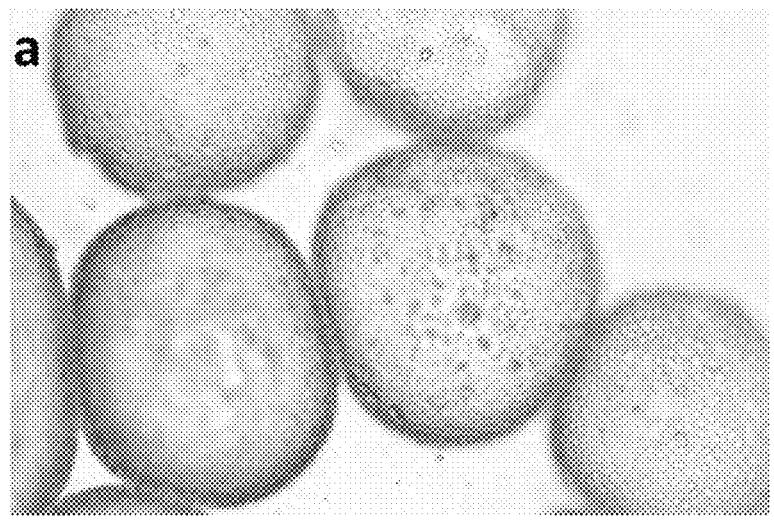
FIG. 4(a) is an optical image of microcapsules from example 1.
Figure 4B:
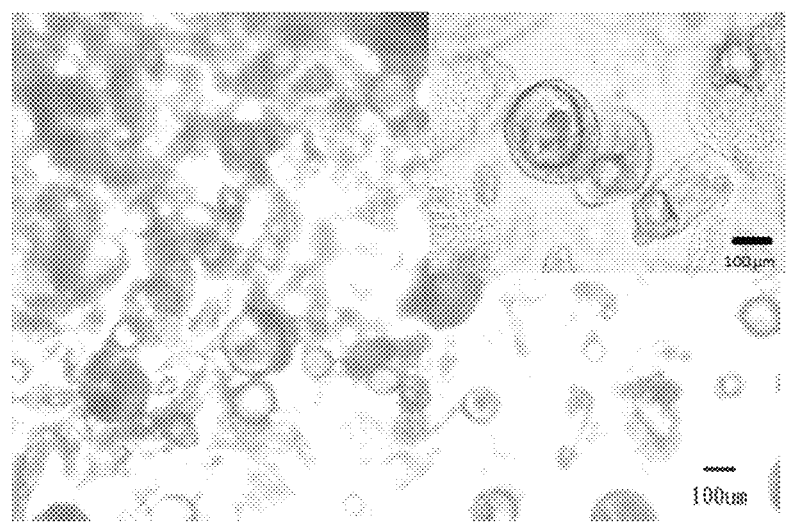
FIG. 4(b) is an optical image of microcapsules from example 1 modified with chitosan. The inset shows a single microcapsule.

Optical microscopy by dynamic mechanical analyzer (DMA 7, Perkin-Elmer) was used to characterize the mechanical properties of the polymeric shell component of the silica-based microcapsules. The testing was carried out at room temperature with a linear force of 8,000 mN on a poly(urea-urethane) film using a probe tip. FIG. 4(a) shows how microcapsules are seen in an optical microscope. It is evident that the core component is in liquid state surrounded by a polymeric solid shell. FIG. 4(b) shows another optical microscope image of the self-healing microcapsule after being modified with chitosan which resulted to be compatible with water medium. In this image, there is no concrete involved but only the microcapsules with chitosan. The chitosan (5% wt.) to microcapsule volume ratio used is 20:2.

Figure 5:
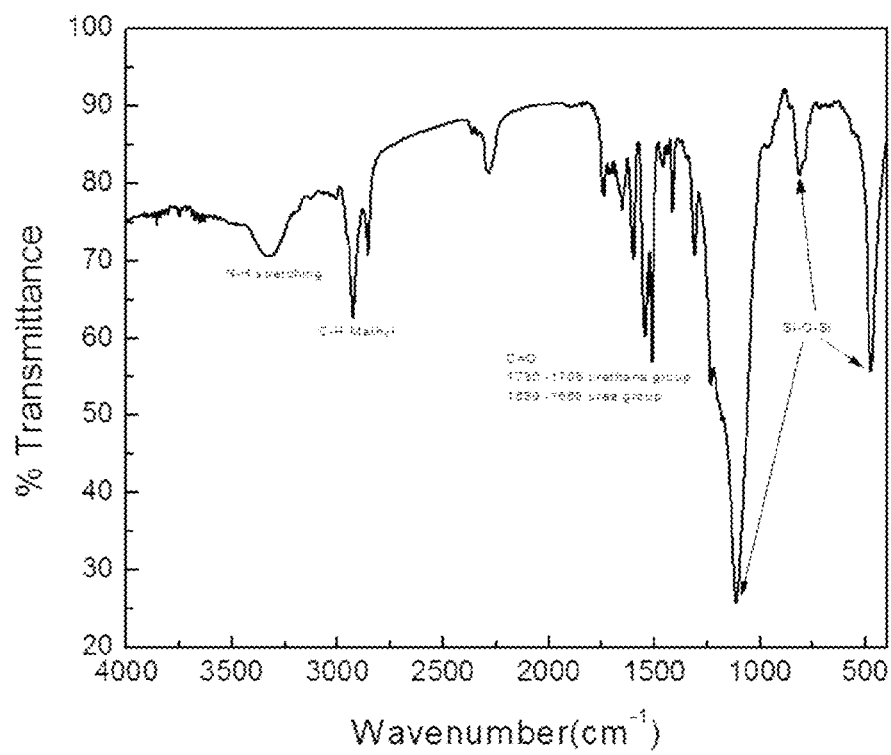
FIG. 5 is FTIR spectrum of the microcapsule from example 1 showing its components (e.g. silica and poly(urea-urethane)).

Fourier Transform Infrared (FTIR) Spectroscopy measurements was performed in an FTIR spectrophotometer (Bio-Rod FTS6000). Sample was prepared by drying and mixing with KBr salt and pressed into disk, measured with a spectral range of 400-4000 cm$^{-1}$. From the FTIR spectroscopy of the microcapsules in FIG. 5, the appearance of the peak at 1705-1730 cm$^{-1}$ represent carbonyl of the free and bonded urethane groups while peaks 1660-1690 cm$^{-1}$ represent carbonyl for urea groups. Furthermore, N-H stretching at 3300-3450 cm$^{-1}$ and C—H asymmetrical at 2920 cm$^{-1}$ also provide signatures for polyurethane groups. Silicon dioxide groups are represented by triple peaks; bending at 472 cm$^{-1}$, stretching at 803 cm$^{-1}$ and vibration at 1100 cm$^{-1}$. Thus, the microcapsule contains both the silica core and the polymeric shell of poly(urea-urethane).

Figure 6:
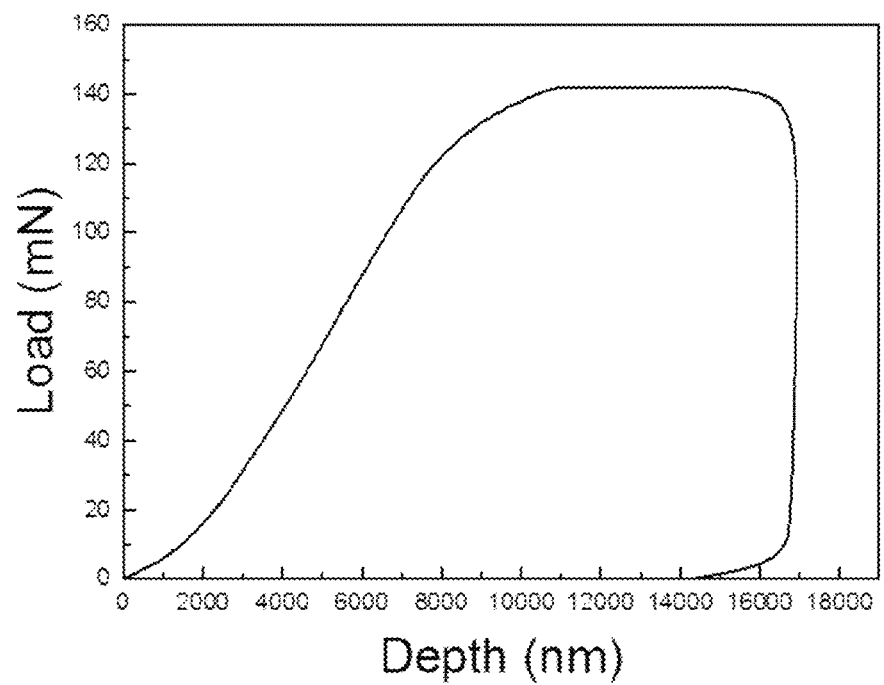
FIG. 6 is a nanoindentation analysis showing ultimate strength of microcapsules from example 1.

A nanoindentation analysis of the prepared microcapsules was carried out. The force-displacement relationship in three stages is shown in FIG. 6. First is the loading stage wherein force increases with depth of the microcapsule until it reaches its maximum load (140 mN) where force became constant at certain holding time (second stage). The third stage is the sudden fall of the load at a certain depth of the microcapsule, indicating the rupture of the microcapsule and thus ultimate strength of the microcapsule.

Figure 7:
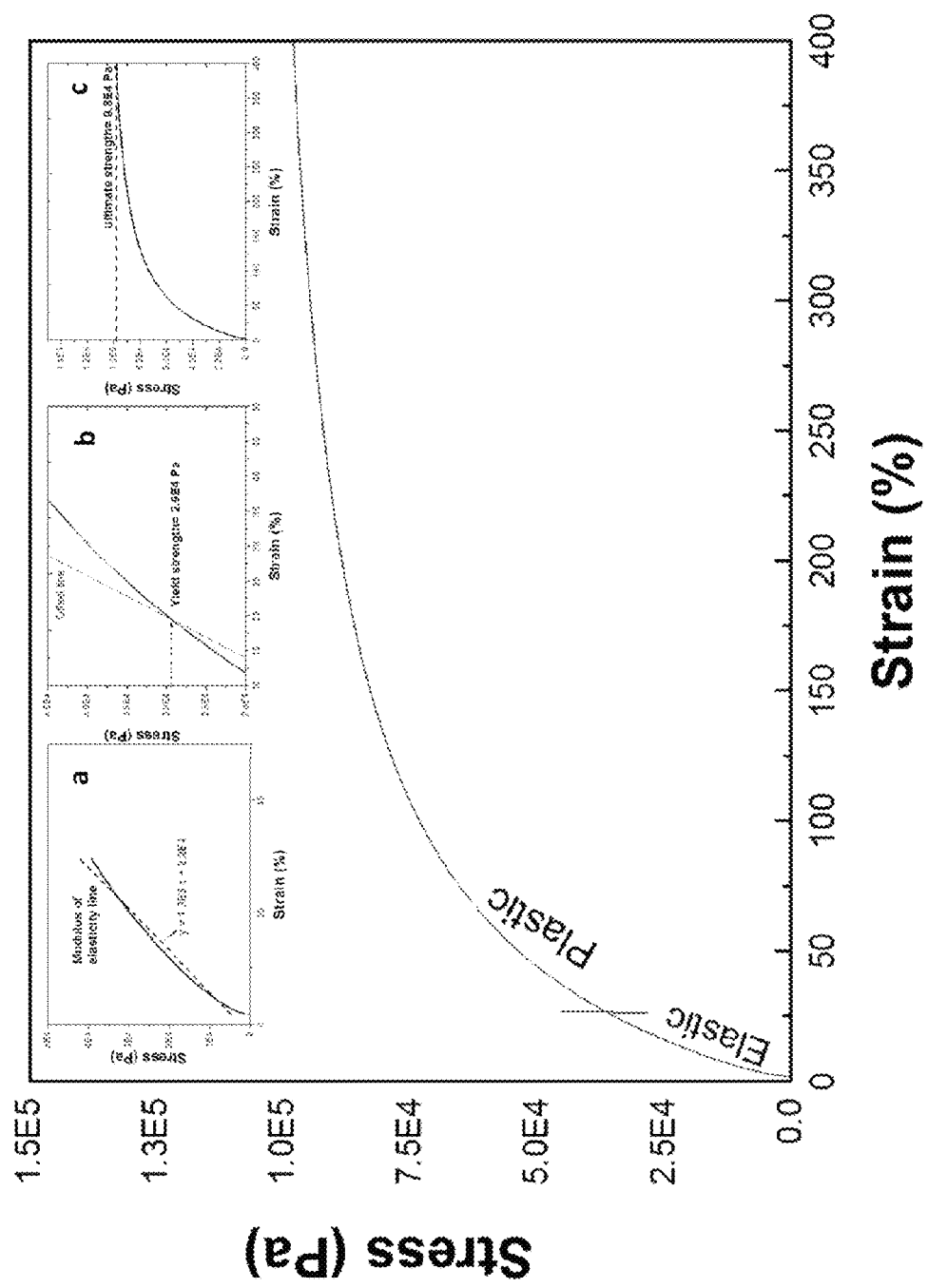
FIG. 7 is a stress-strain diagram for poly(urea-urethane) film used as polymeric shell in silica based microcapsules. Insets are figures that derive a) elasticity modulus, b) yield strength, c) ultimate strength.

The mechanical properties of the polymeric shell material (i.e. poly(urea-urethane)) was further analyzed by a dynamic mechanical analyzer (DMA 7, Perkin Elmer) wherein tensile stress was applied on a poly(urea-urethane) film sample and thus derived a stress-strain diagram (FIG. 7). FIG. 7 demonstrates both elastic and plastic properties, yield strength and ultimate strength of the poly(urea-urethane) film which is used as a polymeric shell layer of the self-healing microcapsules. The elastic property of the film is depicted on the linear curve (FIG. 7 inset a). This curve has a slope of 1.3 kPa, which corresponds to the elasticity modulus value. It shows that poly(urea-urethane) film, at a certain load or stress range, is proportional to the elongation or strain it experiences. However, at a specific point or load, stress becomes constant while strain increases (FIG. 7 inset b). This new curve derives the yield strength of 29 kPa and represents the plastic property of the poly(urea-urethane) film. Finally, FIG. 7 inset c shows a linear curve from the peak of the original plot representing the ultimate strength curve. Ultimate strength is derived from the peak point of the stress-strain curve. It has a value of 98 kPa.

EXAMPLE 2

12 pieces of beams (30 cm×10 cm×4 cm) for flexural strength were prepared using the component ratio in Table 1. A mix of 7.84 kg of cement, 11.76 kg of sand, 15.68 kg of rock and 2.74 kg of water, 570.24 g of SP8 and 792 mL of microcapsules from example 1 were contained in a concrete mixer and poured in a beam molders. After a day, samples were stripped from their molds, and submerged in water for 14 days to ensure full curing.

Flexural Strength Test

Flexural strength procedure was adapted from ASTM C78/C78M-10 and BS 1881: Part 118 with 22.5 cm×7.5 cm×3.5 cm dimension samples. Each sample was subjected to an applied load of 0.50 mm/s in a 4-point bending instrument. Initial strength was determined by applying load until sample reached failure. To induce micro-cracking, samples were loaded at 80% of its initial strength, healed for several days and re-tested to failure again.

Figure 8:
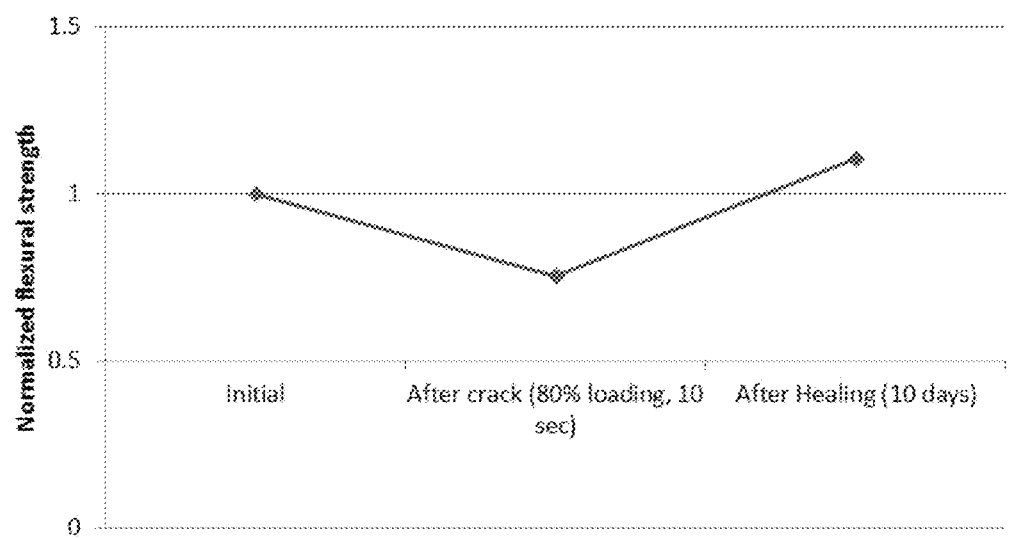
FIG. 8 is a graph illustrating the change of flexural strength of self-healing concrete after cracking and healing.

Results of the initial and retested samples were an average of three specimens as shown in FIG. 8. It shows that the concrete with microcapsules reaches at a flexural strength greater than the initial one after healing.

EXAMPLE 3

A self-healing concrete in cubes (15 pieces) with size of 10 cm×10 cm×10 cm used for compressive strength testing were prepared using the component ratio in Table 1. A mix of 8.91 kg of cement, 13.36 kg of sand, 17.81 kg of rock and 3.12 kg of water followed by 648 g of SP8 and 900 mL of microcapsules from example 1 were provided to a concrete mixer. The mixture was poured on a cube molder and stripped after a day. Samples were submerged in water for 14 days to ensure full curing.

Compressive Strength Test

Compressive strength of self-healing concrete containing microcapsule was compared with a normal concrete (control) before and after microcracking occurs. The normal concrete as control was prepared as in example 3 except the addition of SP8 and microcapsules.

Figure 9:
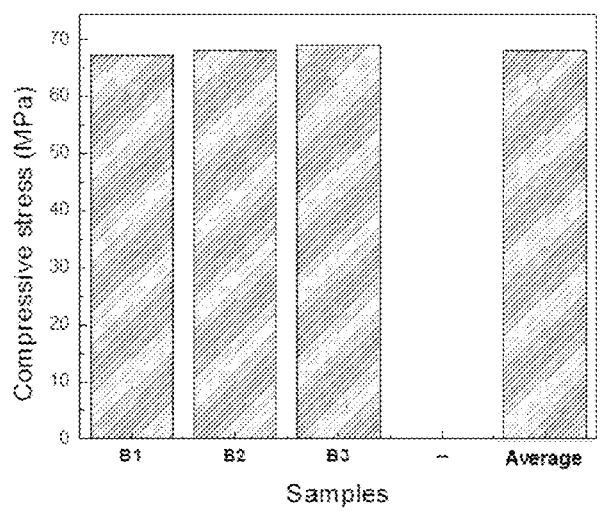
FIG. 9 shows the initial compressive stress of self-healing concrete with three replicates and their average value.

Compressive strength procedure was adapted from ASTM C39/C39M-10 and BS 1881: Part 116f for cube samples with 10 cm×10 cm×10 cm dimensions. The testing machine was equipped with s steel bearing platens with hardened faces larger than the size of the samples. The rate of load or stress ranged from 0.2-0.4 MPa/s. Initial compressive stress was determined with three replicates by applying stress on samples until it reached failure. The measured values and the average value are presented in FIG. 9. The average value is 68.1 MPa.

Figure 10:
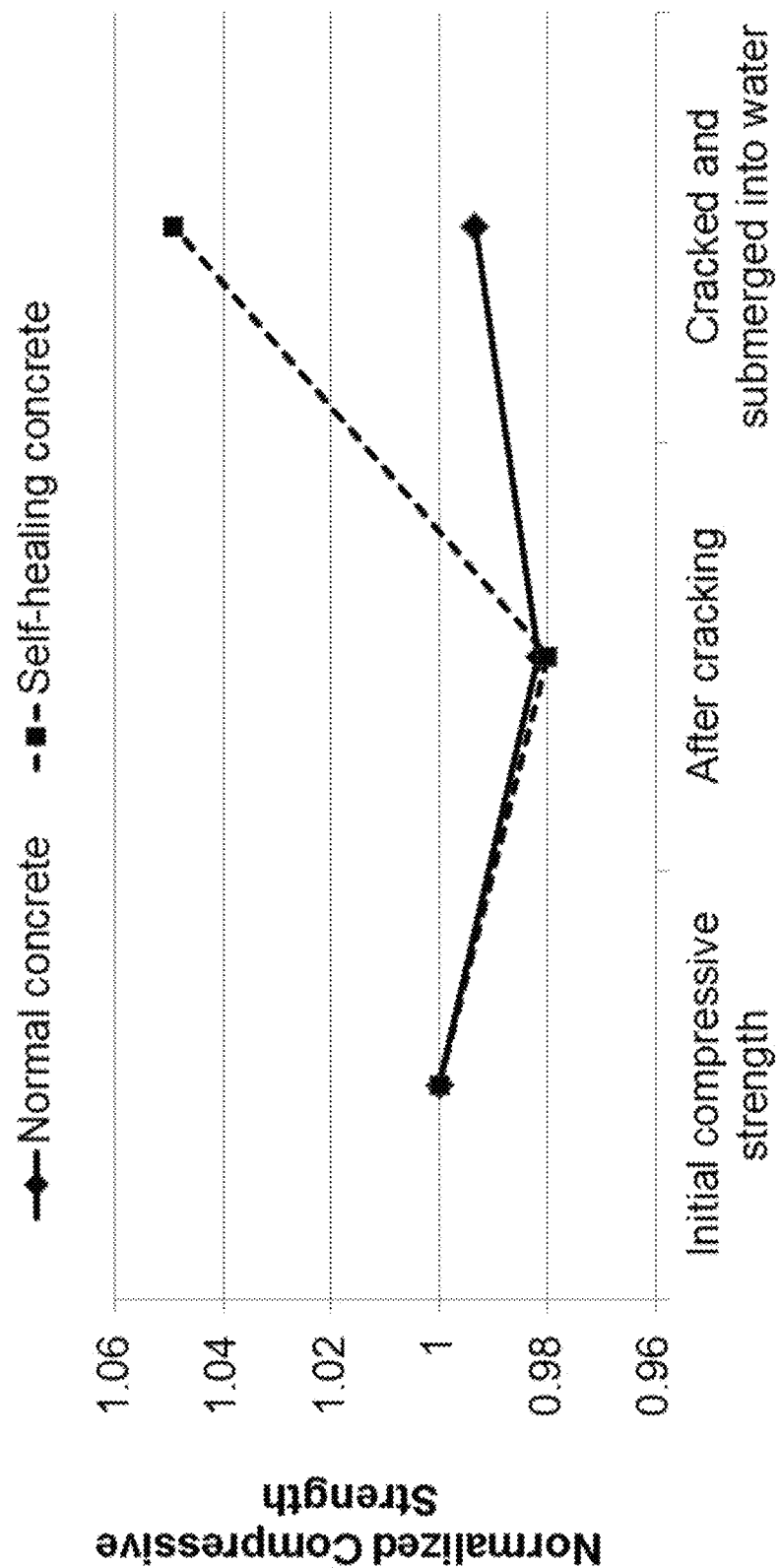
FIG. 10 is a graph illustrating the change of compressive strength of self-healing concrete after cracking and healing.

Succeeding experiments on example 3 were carried out by applying stress until sample reached a maximum load before failure. This was at 80% of the initial stress for 10 seconds to induce micro-cracking. After which, samples were submerged in water again for healing and retested to failure again. Results of the initial and retested samples were an average of three specimens as shown in FIG. 10. The concrete with microcapsules recovered with a compressive strength exceeding its initial one.

Water Absorptivity

Figure 11:
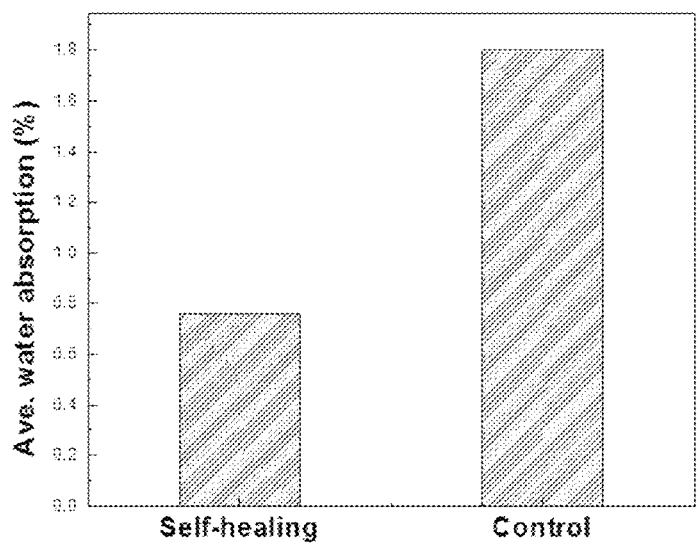
FIG. 11 is a graph showing the water absorptivity of the self-healing concrete and control.

Water absorptivity procedure was adapted from ASTM C642-06 and BS 1881: Part 122 with 10 cm×10 cm×10 cm dimension samples from example 3 and control. Initial water absorptivity of the self-healing concrete and control were shown in FIG. 11. The average value of self-healing concrete is 55% less than the control sample.

Figure 12:
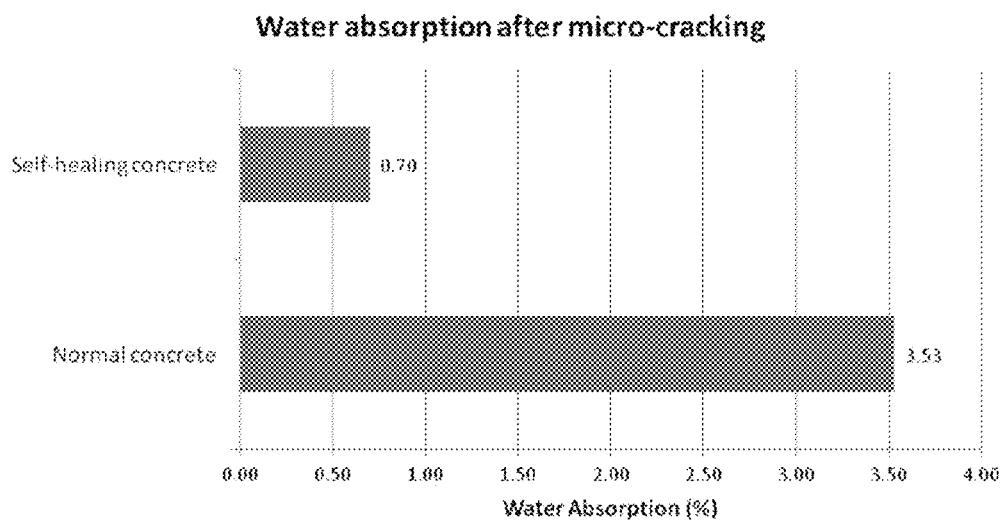
FIG. 12 is a graph showing the water absorptivity of the self-healing concrete and control after micro-cracking.

Samples were first cured in a drying oven for 72 hours and cooled at for 24 hours at room temperature. Samples were weighed and immediately immersed in a water tank. Samples were removed from the tank after 30 minutes, surface dried and weighed again. Results of the water absorptivity were an average of three replicates as shown in FIG. 12.

Certain features of the application have been described with reference to example embodiments. However, the description is not intended to be construed in a limiting sense. Various modifications of the example embodiments, as well as other embodiments of the application, which are apparent to persons skilled in the art to which the application pertains are deemed to lie within the spirit and scope of the application.

What is claimed is:

1. A process for preparing a composite material comprising:
    emulsifying a colloidal silica core in presence of a solvent and a mixture of at least two surfactants at an emulsifying speed within a range of 400-600 rpm, wherein the mixture of at least two surfactants is having a hydrophile-lipophile balance (HLB) within a range of 3.0-5.0; and
    encapsulating the emulsified colloidal silica core with a polymer shell to form a plurality of microcapsules.

2. The process of claim 1, wherein the weight percentage of silicon dioxide in the colloidal silica ranges from about 40% to about 50%.

3. The process of claim 1, wherein the surfactants are selected from the group consisting of poly(ethylene glycol)-400 dioleate, poly(ethylene glycol)-8 dioleate, sorbitan laurate, poly(ethylene glycol)-40 sorbitan peroleate, lecithin glycol distearate, sorbitan trioleate and propylene glycol isostearate.

4. The process of claim 1, wherein the surfactants comprise one selected from the group consisting of poly(ethylene glycol)-8 dioleate, sorbitan laurate, poly(ethylene glycol)-40 sorbitan peroleate and lecithin, and another selected from the group consisting of glycol distearate, sorbitan trioleate and propylene glycol isostearate.

5. The process of claim 1, wherein the surfactants comprise poly(ethylene glycol)-400 dioleate and sorbitan trioleate.

6. The process of claim 1, wherein the polymeric shell comprises at least one selected from the group consisting of polyurethane, polyurea, poly(urea-urethane), polystyrene, and urea-formaldehyde polymer.

7. The process of claim 1, wherein the microcapsule comprises a size of about 100 microns to about 200 microns, and the polymeric shell comprises a thickness of about 30 microns to about 50 microns.

8. The process of claim 1, wherein the encapsulating step comprises a stirring step at a speed of about 700-950 rpm.

9. The process of claim 1, further comprising adding surfactants.

10. The process of claim 1, further comprising embedding a plurality of the microcapsules in a concrete mixture.

* * * * *